United States Patent [19]

Philippon et al.

[11] 4,134,717

[45] Jan. 16, 1979

[54] APPARATUS FOR THE DEPOSITION AND PRESHAPING OF A BAND SECTION IN A SHAPING MOLD

[75] Inventors: Raymond C. Philippon, Saint-Cloud; Jean-Claude H. Hautemont, Gif-sur-Yvette, both of France

[73] Assignee: Etude et Realization de Chaines Automatiques ERCA, Orsay, France

[21] Appl. No.: 792,603

[22] Filed: May 2, 1977

[30] Foreign Application Priority Data

May 5, 1976 [FR] France .............................. 76 13433

[51] Int. Cl.² .......................................... B29C 17/00
[52] U.S. Cl. ................................. 425/383; 425/292; 425/304; 425/305.1
[58] Field of Search ................. 425/292, 304, 305 R, 425/383

[56] References Cited

U.S. PATENT DOCUMENTS

| | | | |
|---|---|---|---|
| 3,605,192 | 9/1971 | Edwards | 425/292 |
| 3,646,190 | 2/1972 | Spyra | 264/297 |
| 3,709,643 | 1/1973 | Nasica | 425/109 |

*Primary Examiner*—Robert L. Spicer, Jr.
*Attorney, Agent, or Firm*—Bacon & Thomas

[57] ABSTRACT

Apparatus for the deposition and preshaping of a band section in a shaping mould.

It comprises rotatable applicator members which are on the one hand positioned below the upper face of the base plate in such a way that they are located in the vicinity of and face the displacement path of at least portions of the side wall of the shaping cavity of the mould, said portions being called junction portions and have a smaller radius of curvature than that of the other portions of the side walls and are on the other hand operated in such a way that they can draw the band section against said junction portions during the upward movement of the mould or moulding units, as well as maintaining means which are able to maintain at least approximately the band section in the position imposed on it within the shaping cavity by applicator members, wherein the internal shoulder of the shaping cavity is interrupted by vertical passage slots at the location of the junction portions so that passages are left for the applicator members, wherein the base plate has lateral covering protruberances which are able to penetrate into said slots with a certain lateral clearance and which cover the major portion of the applicator means, and wherein the transfer member and its control rod are hollow and positioned concentrically to the supporting rod.

A particular application is to the thermal shaping station of a packing machine.

15 Claims, 8 Drawing Figures

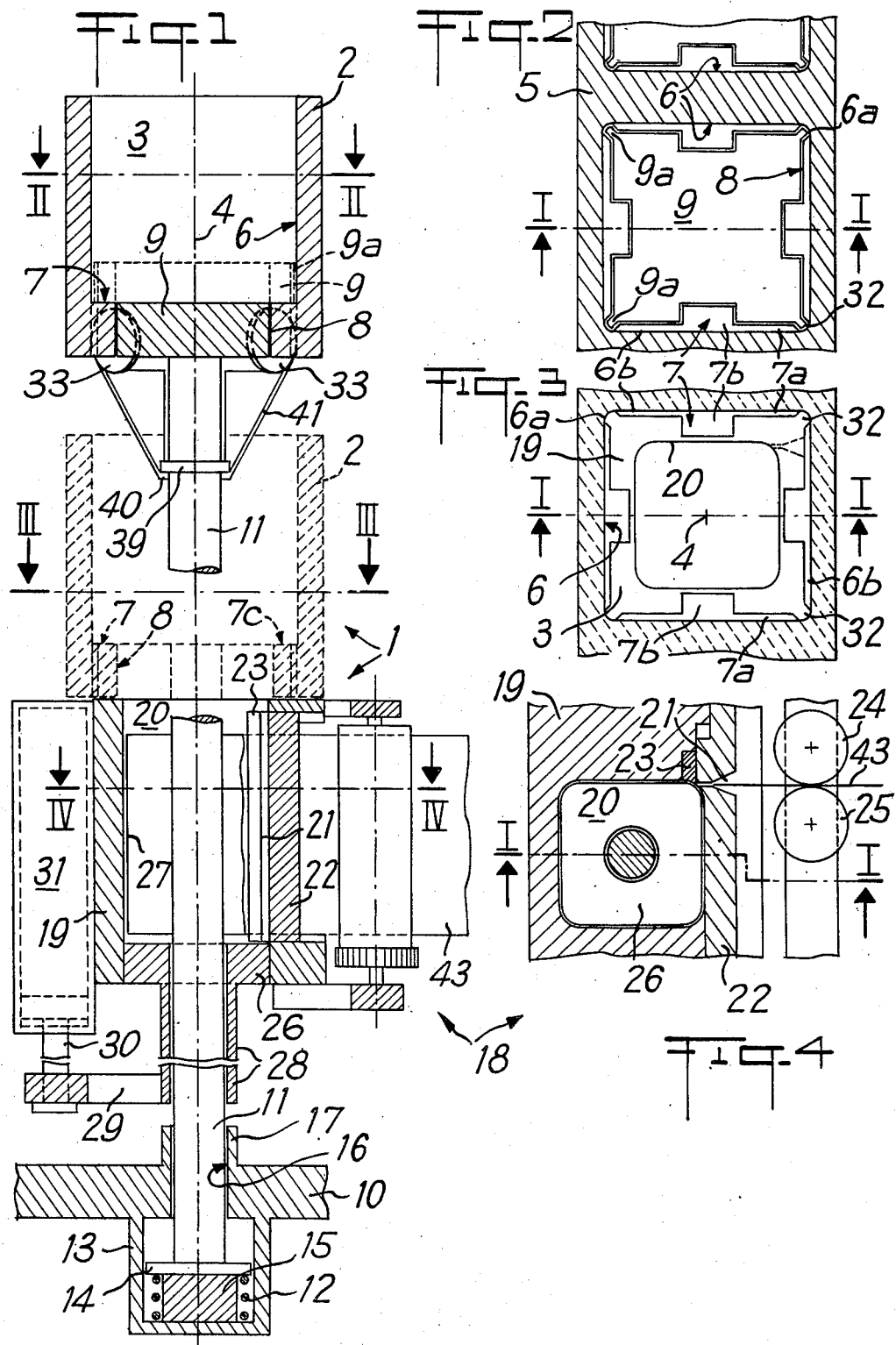

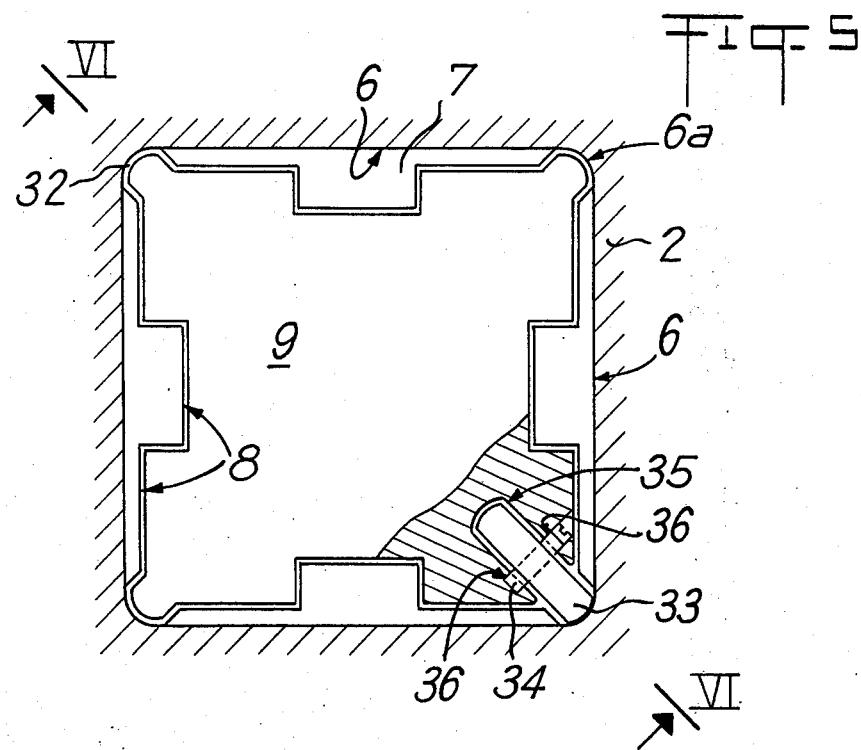
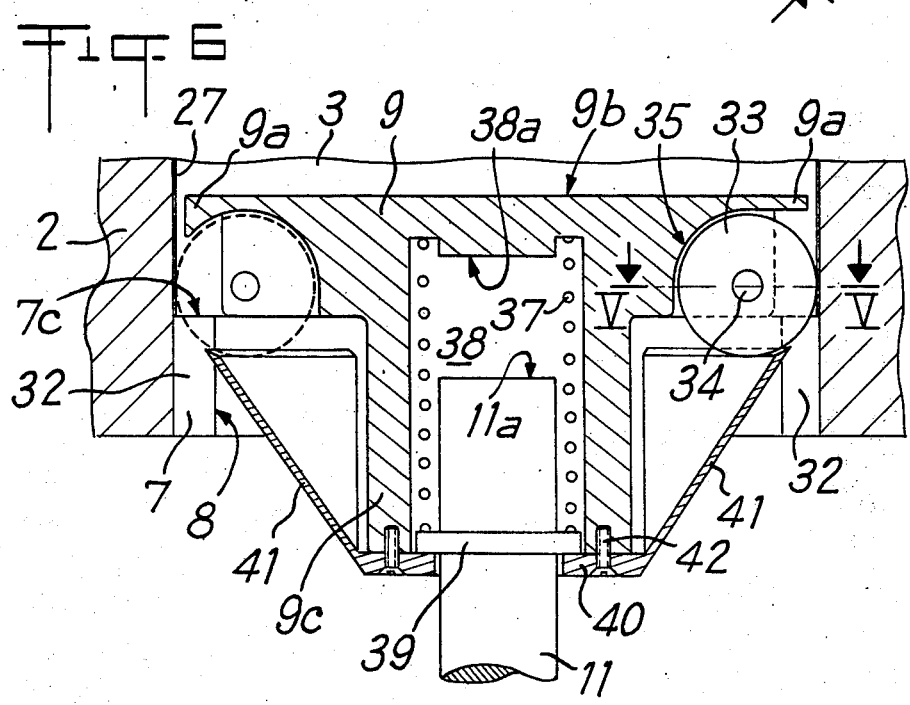

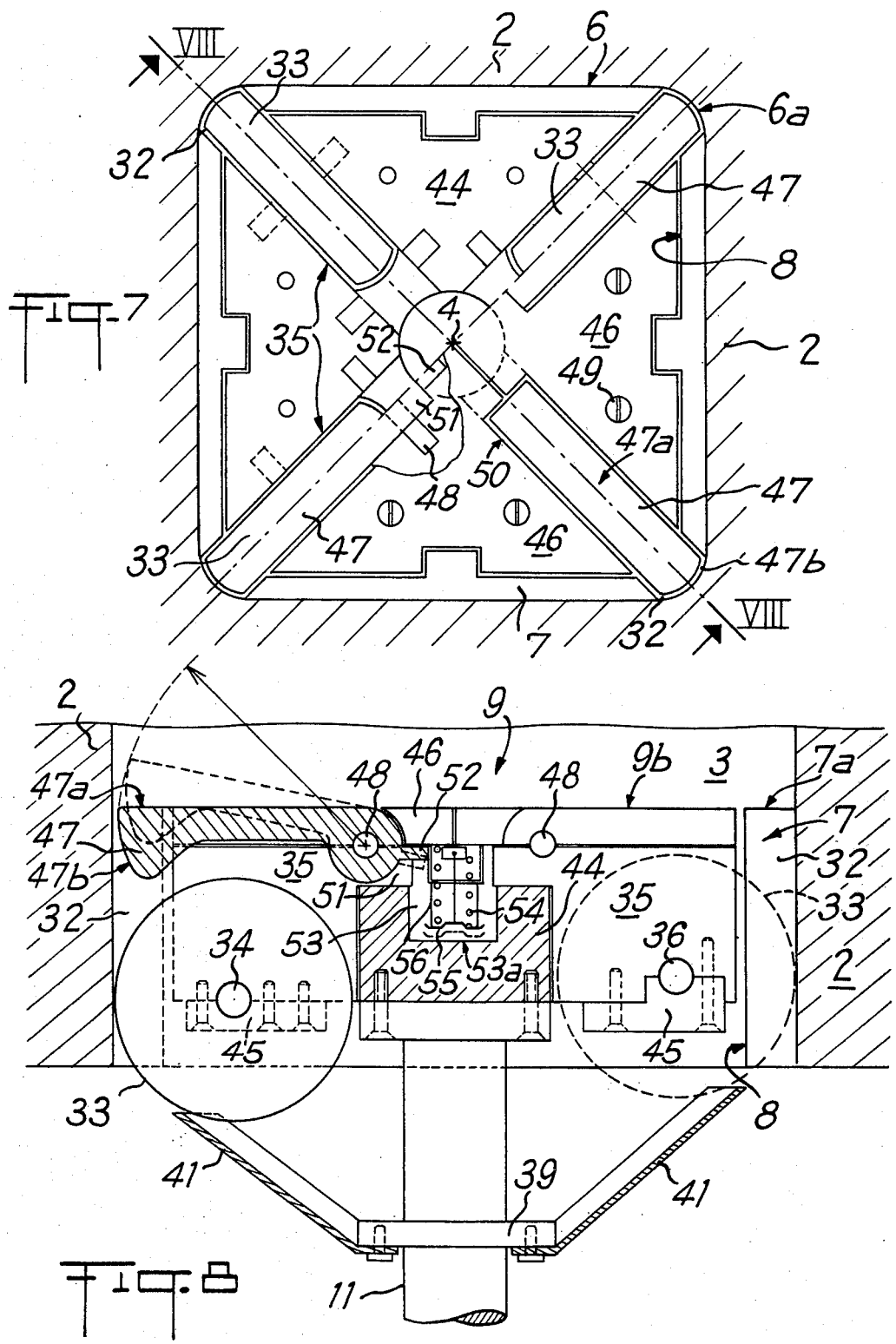

APPARATUS FOR THE DEPOSITION AND PRESHAPING OF A BAND SECTION IN A SHAPING MOLD

BACKGROUND OF THE INVENTION

The present invention relates to an apparatus for the deposition and preshaping of a band section in a shaping mould which is provided in a thermal shaping station for containers incorporated in a packing machine and which has a base supported on a machine frame which is able to move relative to a moulding unit having at least one shaping cavity defined by the inner side walls of the mould, said unit being vertically movable between an upper position, called the thermal shaping position and a lower position, called the container discharge position, said apparatus being of the type comprising a transfer member such as a plunger equipped with a control rod and mounted in sliding manner, preferably without a significant lateral tolerance, in a cylindrical cavity, called a prewinding cavity, of a band section prewinding unit, said prewinding cavity being open at least towards the moulding unit and is operated in such a way that it receives a band section and is fixed in such a way that it is preferably located below and in the immediate vicinity of the discharge position from the moulding unit and aligned with the said shaping cavity which, at its lower end has an inner shoulder extending perpendicularly to the axis and towards the inside of the shaping cavity and at the most up to the extension of the prewinding cavity, the base of the mould comprising a base plate which is supported on the machine frame via a supporting rod and whose dimensions are such that the side walls can engage without a significant lateral clearance in the base opening defined by the said internal shoulder.

Such an apparatus is in part known from French Patent 2,034,915. In a prewinding cavity, the said apparatus uses a transfer plunger which drives the band section into the shaping cavity when the latter is aligned with the said prewinding cavity. Shaping cavities are also known which are located in a moulding unit and whose bases are constituted by base plates supported on a frame, the moulding unit being movable relative to said base plates between an upper or shaping position and a lower or discharge position (cf French Pat. No. 2,051,643). Moulding units are also known which are movable relative to base plates supported on a machine frame and whose end has prewinding cavities (cf French Patent Application 2,256,013), the shaping cavities of the moulding units being provided at their lower end with internal shoulders. As a result of their design, none of the known apparatuses or the combination of certain components of said apparatuses permits the application of the band section against the internal side walls of each shaping cavity and more particularly against the wall portions having a small radius of curvature and to maintain them in this position until moulding thereon has taken place by the thermoplastic material constituting the container to be shaped.

BRIEF SUMMARY OF THE INVENTION

The present invention eliminates the above disadvantage and has for its object the realisation of an apparatus for the deposition and preshaping of a band section of the type indicated hereinbefore and which makes it possible to obtain a container, whereof at least a portion of the walls comprises a band section externally of the thermoplastic material walls of the container, said walls being produced by thermal shaping. Moreover, the apparatus must be designed in such a way that it prevents the acceleration and/or deceleration of large masses during the movement of the mould between their two end positions. Thus, it is possible to conceive making the prewinding cavity integral with the shaping cavity in a common movable unit. As the travels of the mould and therefore of the common unit between the two end positions thereof correspond in this case to inactive time, that is to say wasted time, they must be carried out with maximum rapidity. However, this would involve very significant mass accelerations and decelerations, as well as the use of corresponding means. However, when the body of the prewinding cavity is integral with the unit comprising the shaping cavity, the available time for placing the band section in the prewinding cavity is at the most equal to that attributed to the actual thermal shaping operation of a container.

With an apparatus of the type mentioned hereinbefore, the object of the invention is achieved in that it also comprises rotatable applicator members which are on the one hand positioned below the upper face of the base plate in such a way that they are located in the vicinity of and face the displacement path of at least portions of the side wall of the shaping cavity of the mould, said portions being called junction portions and have a smaller radius of curvature than that of the other portions of the side walls and are on the other hand operated in such a way that they can draw the band section against said junction portions during the upward movement of the mould or moulding units, as well as maintaining means which are able to maintain at least approximately the band section in the position imposed on it within the shaping cavity by applicator members, wherein the internal shoulder of the shaping cavity is interrupted by vertical passage slots at the location of the junction portions so that passages are left for the applicator members, wherein the base plate has lateral covering protruberances which are able to penetrate into said slots with a certain lateral clearance and which cover the major portion of the applicator means, and wherein the transfer member and its control rod are hollow and positioned concentrically to the supporting rod.

As a result of these measures, the band section can be given a shape which is adapted to that of the shaping cavity, and this applies more particularly to those portions of the band section located at the junction portions of the internal side walls of the mould, without the surface of said section being subjected to a significant frictional force by the applicator members, whereby said sections can be maintained in the imposed position until mould-over takes place. Moreover, the masses to be displaced at high speed between the end positions of the moulds or moulding units are greatly reduced and the time available for placing the band sections in the prewinding cavity extends from the start of the upward movement and finishes at the end of the downward movement of the mould. Thus, the various movement times of certain components of the deposition and preshaping apparatus are perfectly adapted to the different operating phases of the packing machine and are incorporated therein in an advantageous manner, without adding a waiting time thereto.

Advantageously, the rotatable applicator members are mounted directly on the base plate in such a way that they rotate at least about a rotation axis located in a horizontal plane perpendicular to the displacement path of the moulding unit.

The rotatable applicator members can be constituted by balls located in a horizontal cage or by rollers mounted on horizontal spindles, integral with the base plate. Applicator members, such as rollers, are fitted in locating grooves provided in the base plate in such a way as to be open towards the bottom and outside, said applicator members thereby project laterally from said locating grooves. If the band section placed in the moulding cavity must be applied progressively in the circumferential direction against the internal side walls of the mould, proportionately to the raising of the latter from its discharge position towards its shaping position it is advantageous to position the applicator members, especially those facing the wall junction portions at different levels relative to the upper face of the base plate.

The maintaining means make it possible to keep the band section at least approximately in its imposed position and comprise a supporting spring located between the base plate and the machine frame on which said plate is mounted and which is able to maintain the said plate above the level of the internal shoulder of the shaping cavity when the moulding unit occupies the shaping position. As a result of this measure when the mould or moulding unit has reached its upper shaping position the lateral covering protruberances are still located within the shaping cavity and prevent the band section from rolling up again and/or returning towards the axis of the shaping cavity, but without said protruberances applying said section against the inner walls of the mould. It is only at the end of the container shaping operation that the container being shaped drives the base plate downwards until it strikes against an end of travel stop and its upper face coincides with that of the inner shoulder.

The supporting spring is placed either between the machine frame and the supporting rod of the base plate, or between the supporting rod and the base plate.

According to another feature of the invention, the maintaining means have, above each applicator member, a covering finger which pivots about a horizontal spindle integral with the base plate and for each finger the base plate has a locating groove which extends radially and serves to receive without any significant lateral clearance the said pivotable finger, whereof the upper face can coincide with that of the base plate and whose outer portions constitute lateral covering protruberances which can be located in the passage slots.

This measure makes it possible for the fingers to escape upwards during the upward movement of the mould, whereby there is no friction or only slight friction thereof against the band section. However, this measure also makes it possible to lock said section approximately in the position imposed on it by the applicator members as soon as the mould stops in its upper shaping position, because the fingers remain in the inclined position within the shaping cavity under the action of the band section which tends to move towards the centre of said cavity and bear against the outer ends of said fingers. Moreover, during the completion of the container shaping operations, that is to say after the upper portion of the band section has already been fixed in its application position against the inner walls of the mould, i.e. the shaping cavity, the fingers are lowered into the horizontal plane of the upper face of the base plate under the action of the final shaping of the container.

Advantageously, the front face of each covering finger which faces the inner side walls of the shaping cavity of the mould has on the one hand in horizontal cross-section a shape which is identical to that of the cross-section of the inner wall portion facing the said finger and on the otherhand in vertical radial section passing through the axis of the shaping cavity has a curved relief shape passing from top to bottom and towards the outside, i.e. from the inner walls of the mould towards the inside, that is towards the axis of the shaping cavity of the mould, whereby the minimum spacing between the front face of the finger and the corresponding inner wall portion is at least equal to the thickness of the band section. This measure makes it possible to obtain a very rapid disengagement of the front face of the covering finger relative to the inner side walls of the shaping cavity and to obtain a sufficient covering of the passage slots by the fingers in the horizontal lowered position when the upper face of the base plate coincides with that of the inner shoulder of the shaping cavity.

In order to aid the lowering movement of the covering finger towards its horizontal position, said finger has means which pour its outer portion downwards, whereby said means can comprise a supplementary mass positioned between the front face and the finger pivot, whilst a positioning stop integral with the said finger and which can bear against a portion of the base plate when the finger is in the horizontal position prevents the upper face of the finger from passing below the level of the upper face of the base plate.

In certain cases, particularly when the material constituting the band sections is very brittle and the covering fingers must not be in frictional contact with the said sections during the upward movement of the mould or moulding unit it is advantageous to associate with the covering fingers a return spring which pulls said fingers in such a way that their upper faces are raised slightly above the upper face of the base plate. In this case, the base plate can have a central opening for the return spring, as well as a supporting cup located in said central opening and suspended on the positioning stops of the covering fingers in such a way as to be located at a small distance from the base of the central opening when the fingers are in a horizontal position and also serves as a support for one of the ends of said return springs, the other end of which bears against the upper walls of the central opening. Obviously, the tension of the return spring is sufficiently small to permit the fingers to be lowered without difficulty into the horizontal position by the container being shaped at the end of the container shaping operation.

In order to progressively bring the upper portion of the band section into contact with the applicator members deflectors are provided below the applicator members and which are retracted relative to the outer portion of said members. The deflectors are fixed to the base plate or to a member connected therewith and are inclined inwardly and downwardly, being positioned tangentially relative to the said applicator members.

BRIEF DESCRIPTION OF THE DRAWINGS

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the invention and the scope of the appended claims. In the drawings show:

FIG. 1 a vertical section of a first embodiment of the apparatus for the deposition and preshaping of a band section, the vertical section being located in a plane which passes along the lines I—I of FIGS. 2 to 4 through the axis of a shaping cavity of a mould and is parallel to the direction of advance of the thermally shaped containers.

FIG. 2 a plan view of the cross-section of the apparatus according to the invention passing through the shaping cavity along the line II—II of FIG. 1.

FIG. 3 a plan view of a cross-section of the mould along the line III—III of FIG. 1.

FIG. 4 a plan view of a cross-section of the deposition and preshaping apparatus along the line IV—IV of FIG. 1.

FIG. 5 a plan view, partly torn away, of part of a second embodiment of the deposition and preshaping apparatus according to the invention, the partial tearing away being a plan view of a cross-section along the line V—V of FIG. 6.

FIG. 6 an elevation of a vertical section along diagonal line VI—VI of FIG. 5.

FIG. 7 a plan view of part of a third embodiment of the deposition and preshaping apparatus.

FIG. 8 an elevation of a vertical section along diagonal line VIII—VIII of FIG. 7.

DETAILED DESCRIPTION OF THE PREFERRED EMBODIMENTS

As can be seen in FIGS. 1 to 4, the deposition and preshaping apparatus for a band section is designated overall by reference numeral 1 and is associated with a mould or moulding unit 2, having a shaping cavity 3 or a series of shaping cavities, aligned perpendicularly to the direction of advance of the not shown thermally shaped containers and also perpendicular to the various central axes 4 of shaping cavities 3. Several moulds are combined into a moulding unit 5, which therefore has a row of shaping cavities 3. Mould 2 or moulding unit 5 is mounted by means not shown, so as to move vertically between an upper or shaping position (indicated by continuous lines in FIG. 1) and a lower or discharge position (indicated by broken lines in FIG. 1). Moulds so movable are well known in the art wherein a mould cavity is movable between a lower position and an upper position wherein plastic material is shaped in the mould to form the desired container. In order to simplify the description, reference will be made hereinafter to only a single mould 2, but it is obvious that the object of the invention also applies to a row of moulds. At its lower end, the shaping cavity 3, delimited by the inner side walls 6 of the mould comprises an inner shoulder 7 which projects towards axis 4 of shaping cavity 3. The opening of the base 8 of mould 2 or more precisely of the shaping cavity 3 is defined by the inner side walls of shoulder 7 and can be closed in a relatively tight manner by a base plate 9, whose dimensions are such that the side walls can engage without significant lateral clearance in the said opening of base 8. Base plate 9 is independent in its displacement relative to the vertical movement of mould 2. It is mounted on a frame 10 of the not shown packing machine via a supporting rod 11. Base plate 9 can be mounted on frame 10 in two ways. According to a first embodiment, plate 9 is rigidly fixed to frame 10 via supporting rod 11 which is then directly supported on frame 10. In a second embodiment relative to the mounting of plate 9 on machine frame 10, a supporting spring 12 is placed between base plate 9 and frame 10. As can be seen in FIG. 1, supporting spring 12 is located in a box 13 fixed to frame 10 and is supported on the one hand on the base of said box 13 and on the other on an end flange 14, integral with the lower end of supporting rod 11 and also located within box 13. End flange 14 also cooperates with an end of travel stop 15 positioned within box 13 and surmounted by supporting spring 12, determining the lower position of supporting rod 11 and consequently base plate 9, whereby in said lower position the upper face of plate 9 coincides with the upper face of inner shoulder 7 when mould 2 occupies its upper shaping position (FIG. 1).

The travel of base plate 9 is also limited by the lower face of frame 10, in such a way that plate 9 cannot penetrate very far into shaping cavity 3 when mould 2 occupies its upper shaping position. The usefulness of this arrangement will be explained hereinafter during the description of the operation of the apparatus according to the invention. Supporting rod 11 is vertically guided on the one hand by bore 16 made in frame 10 and on the other by a guidance bush 17 mounted on frame 10 as an extension of bore 16.

Below the position occupied by mould 2 in the lower discharge position is provided a prewinding unit for the band section, said unit being designated by the overall reference numeral 18. In a body 19 of prewinding unit 18 is provided a prewinding cavity 20 which is coaxial to the shaping cavity 3. Body 19 is fixed to frame 10 by not shown members. Prewinding cavity 20 is traversed by supporting rod 11 and is laterally accessible through a slot 21 provided for example in a horizontally movable cutter 22 and cooperating with a fixed cutter 23 for cutting the rear end of a band section introduced through slot 21 into prewinding cavity 20 under the action of drive rollers 24 and 25 which rotate about spindles parallel to slot 21 and mounted in bearings which are integral with body 19. Prewinding cavity 20 is open at the top and has in cross-section dimensions which are less than the cross-section of the opening of base 8. At its lower end, the prewinding cavity is closed by a transfer member, such as a plunger 26 which is mounted so as to slide, substantially without significant lateral clearance in cavity 20 and serves for driving or transferring band section 27 located in the prewinding cavity towards shaping cavity 3 when mould 2 is in the discharge position (cf FIG. 1, mould 2 indicated by broken lines). The length of band section 21 in prewinding cavity 20 is generally sufficient to enable said section to cover the entire inner periphery of the shaping cavity 3. The transfer member, i.e. plunger 26 is hollow and surrounds the supporting rod 11. Moreover, plunger 26 is provided on its lower face with a hollow control rod 28 which also surrounds a portion of supporting rod 11 and whose length is sufficient to permit plunger 26 to be driven upwards until its upper face is at least slightly above the upper face of the inner shoulder 7 of shaping cavity 3 when mould 2 occupies its lower discharge position. The lower end of control rod 28 is connected via a bar 29 to the lower end of a rod 30, whose cylinder 31 is integral with body 19 of prewinding unit 18.

As can be seen more particularly in FIGS. 2 and 3, the inner side walls 6 defining the shaping cavity 3 of mould 2 comprise four vertical walls, which are either planar or very slightly curved and positioned substantially perpendicularly to one another in such a way as to be inscribed in a rectangle and more particularly a square. The planar or slightly curved side walls are interconnected by so-called junction wall portions 6a, whose cross-section is defined by a curve having a very small radius of curvature. The apparatus according to the invention more particularly proposes means permitting the application of band section 27 to junction wall portion 6a until said section 27 is moulded-over by the thermoplastic material constituting a portion of the thermally shaped container.

At the location of those wall portions having a very small radius of curvature 6a, inner shoulder 7 is interrupted by passage slots 32 which extend vertically and radially relative to axis 4 of shaping cavity 3. In other words, the junction wall portions 6a also extend over the entire height of inner shoulder 7 and are laterally accessible via passage slots 32 defined on the one hand by two adjacent inner shoulder portions and on the other by junction walls 6a. Facing each planar or slightly curved side wall 6b, inner shoulder 7 comprises two lateral portions 7a of limited width and a central portion 7b of greater width and serving as a retaining member for band section 27 once it has been introduced into shaping cavity 3. Obviously, the width of the central portion 7b of inner shoulder 7 is such that the inner front wall does not project inwardly beyond the corresponding side wall of prewinding cavity 20. Preferably, the inner side wall of central portion 7b of shoulder 7 and the side wall of the prewinding cavity 20 are aligned or alternatively the inner side wall of central portion 7b of inner shoulder 7 is slightly retracted relative to the corresponding side wall of prewinding cavity 20.

The cross-sectional configuration of base plate 9 is adapted to that of the opening of base 8 of shaping cavity 3, said opening of base 8 being defined on the one hand by inner shoulder 7 and on the other by the junction wall portion 6a. It should be noted that when the base plate 9 is engaged in the opening of base 8, there is only a very small lateral clearance between the side walls of base plate 9 and the inner side walls of shoulder 7. At the location of junction wall portion 6a, i.e. the vertical passage slot 32, base plate 9 has covering protuberances 9a, whose upper face is located in the same plane as the upper face of said plate 9 and which are able to penetrate passage slots 32 with a small lateral clearance relative to inner shoulder 7 but with a sufficient lateral clearance relative to junction wall portion 6a to ensure that they do not come into contact with band section 27 when the latter is applied to junction wall portion 6a.

The apparatus for the deposition and preshaping of band section 27 also comprises applicator members 33 which are rotatable and positioned below the upper face of the base plate, at least with reference to the displacement path of the junction side wall portion 6a of shaping cavity 3 of mould 2. Applicator members 33 are largely covered by the body of base plate 9 and by covering protuberances 9a. However, applicator members 33 project beyond the front walls of the covering protuberances 9a by a distance at least equal to the thickness of band section 27 and are arranged so as to be able to draw said band section 27 against the junction side wall portion 6a of the shaping cavity during the upward movement of mould 2 towards its upper shaping position. Obviously, in place of applicator rollers 33 it would also be possible to use balls, whose shape is inscribed in that of the junction wall portion 6a and adjacent portion s of the planar side walls and which are located in a type of ball cage integral with base plate 9.

As can be gathered more precisely from FIGS. 5 and 6, applicator rollers 33 are positioned relative to junction wall portion 6a of shaping cavity 3 in such a way that their median plane coincides with a corresponding symmetrical plane of the corresponding junction wall portion 6a. At the location of the applicator rollers, base plate 9 has locating grooves 35 which are open both downwardly and towards the outside and which can have a shape adapted to that of applicator members 33. The upper portion of locating grooves 35 is covered by the upper portion of base plate 9 provided at this point with lateral covering protuberances 9a. The rotation spindles 34 of applicator rollers 33 are located in bearings or bushes 36 provided in base plate 9 alongside locating grooves 35. Applicator rollers 33 can be made, at least in their peripheral portions, from a relatively elastic and supple material. In order that the contact points between applicator rollers 33 and band section 27 are not all located in the same horizontal plane the rotation spindles 34 can be placed at different levels, preferably in such a way that band section 27 is progressively seized by the applicator rollers 33, considered in the peripheral direction of shaping cavity 3 when mould 2 is raised towards its shaping position (cf FIG. 8).

Instead of using supporting spring 12 arranged in box 13 integral with machine frame 10 (cf FIG. 1) as the maintaining means, it is also possible to use a supporting spring 37 (FIG. 8) which is located and guided within a central locating cavity 38, positioned coaxially in base plate 9. Said central locating cavity 38 is cylindrical and open in the downward direction. Obviously, in this case, supporting rod 11 is rigidly fixed to machine frame 10 and is not therefore mounted in an axially movable manner over a limited path as is the case with the embodiment shown in FIG. 1. The upper portion of supporting rod 11 has an annular shoulder 39 on which is supported the lower end of supporting spring 37, whose other end is supported on the base of the central locating cavity 38 of base plate 9. The upper front face 11a of supporting rod 11 serves as an end of travel stop, identical to end of travel stop 15 and is located at a level such that when base 38a of locating cavity 38 bears against it, upper face 9b of base plate 9 coincides with the upper face 7c of the inner shoulder of shaping cavity 3. Base plate 9 has a lower central portion 9c in the form of a skirt which surrounds the lower portion of central locating cavity 38 and which has at its lower end stop members 40 which can bear against the lower face of annular shoulder 39 of supporting rod 11 and which thus limit the upward travel of base plate 9 relative to supporting rod 11.

Below applicator rollers 33, base plate 9 can have deflectors 41, for example made from sheet metal, which are fixed to retaining members 40 and are fixed via the latter and screws 42 to the lower end of skirt 9c of base plate 9. The deflectors tangentially approach the lower portion of applicator rollers 33 and are inclined from top to bottom and from outside to inside, i.e. towards axis 4 of shaping cavity 3 and the axis of rod 11.

The function of deflectors 41 is to progressively guide the upper portion of band section 27 from the inside towards the outside in order to bring it into contact with applicator rollers 33.

The operating procedure for the apparatus for the deposition and preshaping of a band section is as follows: Whilst mould 2 occupies its upper shaping position, as indicated by continuous lines in FIG. 1, the end of a decorative or non-decorative band 43 is introduced into prewinding cavity 20 of prewinding unit 18 by means of two drive rollers 24 and 25. The end portion of band 43, introduced into prewinding cavity 20 has a sufficient length for subsequently covering the entire periphery of shaping cavity 3 of mould 2 and is therefore wound onto itself. In this position, movable cutter 22 is actuated which, in cooperation with the fixed cutter, cuts said end portion of band 43 in order to constitute a band section 27. During this time, a container has been shaped in the mould in the upper position, base plate 9 has been raised under the action of supporting spring 12 in order to occupy its upper extreme position, as indicated by dotted lines in FIG. 1, and the moulding unit 5 for mould 2 having shaping cavity 3 has moved downwards into the lower end position or discharge position (cf mould 2 in dotted lines) in which said mould 2 rests on the upper portion of the prewinding unit 18. Band section 27 is rapidly transferred by plunger 26 from prewinding cavity 20 towards shaping cavity 3 in such a way that its lower end is located at a slightly higher level than that of upper face 7c of inner shoulder 7. Band section 27, which has previously been would onto itself, laterally relaxes in shaping cavity 3 under the action of its own elasticity in such a way that its lower portion rests against the central portion 7b of inner shoulder 7. In this way, band section 27 has been transferred from prewinding cavity 20 to shaping cavity 3 it can partially unwind to rest on shoulders 7. Plunger 26 can then be lowered towards the lower position and mould 2 can rise towards its upper position. During the raising of mould 2, band section 27 is carried upwards with the said mould 2. During this upward movement, the upper end of band section 27 bears against deflector 41 which progressively deflects it outwards until said band section 27 comes into contact with applicator members, such as rollers 33. Applicator members 33 draw the band section 27 against the junction wall portion 6a, having a very small radius of curvature. Thus, band section 27 assumes a shape which is perfectly adapted to that of shaping cavity 3. When mould 2 has reached its upper shaping position, applicator rollers 33 are no longer in contact with band section 27. Moreover, due to the use of a supporting spring 12 or 37, base plate 9 still remains in shaping cavity 3 and the covering protruberances 9a of base plate 9, said protruberances 9a facing the junction wall portions 6a, retain or maintain the band section 27 in the position imposed on it by applicator rollers 33. With the band maintained in snug contact with the side walls of the shaping cavity and the mould 2 in its upper position, the container itself may be moulded inside the band, in any suitable manner, with the latter then constituting the outer side surface of the container and being adhered thereto. The actual forming of the container itself within the band is not a part of the present invention. As the shaping operation continues, the constituent material of the container also bears against the upper face 9b of base plate 9 and forces the latter downwards until said upper face coincides with the upper face of the inner shoulder 7. It can be seen that band section 27 is perfectly maintained in its imposed position from start to finish of the shaping operation of the container, without it being necessary to maintain said band section 27 against the junction wall portions by means of suction. It should be noted that in general the tension of the supporting spring is too small to enable the base plate 9 to itself return towards it s upper position or for said plate to itself expel the shaped container.

FIGS. 7 and 8 show a further embodiment of the maintaining means used within the scope of the deposition and preshaping apparatus according to the invention. In this case, base plate 9 comprises a lower base block 44 in which are provided vertical locating grooves 35 for applicator rollers 33. The periphery of base block 44 is adapted to the shape of the opening of base 8 of shaping cavity 3, said opening of base 8 being defined by the inner shoulder 7 of cavity 3. On the lower face of base block 44 are provided locating bearings 36 arranged in the vicinity of locating grooves 35 and maintained in place by means of fish plates 45 fixed to the lower face of base block 44. It should be noted that with regard to the members used in this embodiment and which are identical to those used in the embodiment of the preceeding drawings the same reference numerals are used as hereinbefore. In the present case, the locating grooves 35 are open towards the top, the bottom and the outside, but the upper portion of said grooves 35 is covered by covering metal sheets 46 which are fixed to the upper planar face of base block 44 and whose outer periphery precisely coincides with that of base block 44. In place of the lateral covering protruberances of the preceeding embodiments and which are rigidly fixed to base plate 9 in the present case covering fingers 47 are used, whose rear portion is articulated about a horizontal spindle 48 on base block 44. At the location of covering fingers 47, which are perpendicular to locating grooves 35, the covering metal sheets 46 are slotted in an appropriate manner for defining, via their adjacent lateral vertical wall, a locating opening for the covering fingers 47 whose upper face 47a is at the same level relative to the upper face of covering metal sheets 46 of base plate 9 when the covering fingers are lowered into the horizontal position. At the location of the articulation or pivot pins of covering fingers 47, the lower face of covering metal sheets 46 has half-shell-shaped recesses for maintaining said pivot pins in place when metal sheets 46 are fixed by screws 49 to base block 44. It is obvious that the lateral clearances between the different covering fingers and the side walls of the locating openings 50 defined by covering sheets 46 and the passage slots 32 are sufficiently small so that, during the shaping of a thermoplastic material container, said material cannot penetrate into the same. The front face 47b of covering finger 47 has a cross-sectional configuration which is identical to that of the cross-section of the junction wall portion 6a and is removed from the latter, level with the upper face 47a of finger 47, by a distance which is at least equal to the thickness of a band section 27. In vertical radial section passing through axis 4 of shaping cavity 3 front face 47b of covering finger 47 has a curved relief shape, passing from top to bottom and from outside to inside. Moreover, the shape of this front reliefed face 47b is such that the different points located on said face 47b are all located on radii whose centre is pivot pin 48 and which are smaller than the radii passing through the points located on the junction curves between the front face 47b and upper face 47a of said covering finger 47. The front portion of finger 47 is provided with a supplementary mass in the form of a downwardly pointed nose. On its rear portion, covering finger 47 is located in a small slot 51 and carries a positioning stop 52 which can bear against the lower face of the covering metal sheet 46, i.e. against a portion of base plate 9, when finger 47 is in the horizontal position. Base block 44 has a central recess 53 and which is covered by the central portion of covering sheets 46 and into which penetrates the positioning stop 52 of finger 47. A return spring 54 is located within said central recess 53 and is supported on the one hand on the lower face of covering sheets 46 and on the other on a supporting cup 55 suspended via strips 56 on positioning stops 52 of covering fingers 47 in such a way as to be located a small distance from the base 53a of central recess 53 when fingers 47 are in the horizontal position. Return spring 54 draws the supporting cup 55 downwards until it rests on base 53a of central recess 53. Thus, covering fingers 47 are slightly upwardly raised (cf broken line in FIG. 8) and remain within the shaping cavity even when the upper face 9b coincides with the upper face 7a of the inner shoulder. In this upwardly inclined position, covering fingers 47 prevent the band section, which has been previously shaped and applied against the inner walls of mould 2 by applicator rolls 3 from returning into a different position. Thus, at least approximately, band section 27 is maintained in its shaped position because as soon as it leaves the inner side walls of the shaping cavity it bears at certain points against the front face of covering fingers 47 which are not lowered into the horizontal position until the end of the container shaping operation.

In the case of the embodiments shown in FIGS. 7 and 8, base block 44 and consequently base plate 9 are directly fixed to the supporting rod 11 which, at its lower end, is rigidly fixed to machine frame 10. However, it would be possible to use with the embodiments such as shown in FIGS. 7 and 8 an arrangement utilizing a supporting spring 12 or 37, as shown in FIGS. 1 and 6 to give base plate 9 a slight vertical mobility relative to frame 10 and for increasing the penetration height of the covering fingers into shaping cavity 3 of mould 2 when the latter occupies its upper shaping position.

The invention is not limited to the embodiments described and represented hereinbefore and various modifications can be made thereto without passing beyond the scope of the invention.

We claim:

1. An apparatus for the deposition and preshaping of a band section in a shaping mould having at least one shaping cavity defined by the inner side walls of the mould, said mould being vertically movable between an upper position and a lower position, said apparatus being of the type having a transfer plunger equipped with a control rod and mounted in sliding manner in a cylindrical cavity of a band section prewinding unit, said prewinding cavity being open at least towards the moulding unit and adapted to receive a coiled band section and located below and in the immediate vicinity of the lower position of the moulding unit and aligned with the said shaping cavity which, at its lower end has an inner shoulder extending perpendicularly to the axis and towards the inside of the shaping cavity, a base plate for the mould comprising a base plate which is supported on the machine frame via a supporting rod extending generally centrally of said shaping cavity and whose dimensions are such that the side walls thereof can engage without a significant lateral clearance in the base opening of said shaping cavity defined by the said internal shoulder, rotatable applicator members on said base plate positioned below the upper face of the base plate in such a way that they are located in the vicinity of and face the displacement path of at least portions of the side wall of the shaping cavity of the mould, said portions having a smaller radius of curvature than that of the other portions of the side walls, said applicator members serving to draw the band section against said junction portions during the upward movement of the mould relative to said base plate, and maintaining means to maintain at least approximately the band section in the position imposed on it within the shaping cavity by said applicator members, the internal shoulder of the shaping cavity being interrupted by vertical passage slots at the location of the junction portions so that passages are provided for the applicator members, the base plate having lateral covering protuberances which are able to penetrate into said slots with a certain lateral clearance and which cover the major portion of the applicator means, said transfer member and its control rod being hollow and positioned concentrically to the supporting rod.

2. A deposition and preshaping apparatus according to claim 1, wherein the applicator members are rotatable and mounted on members connected to the base plate.

3. A deposition and preshaping apparatus according to claim 1, wherein the rotatable applicator members comprise rollers mounted on horizontal spindles fixed to the base plate.

4. A deposition and preshaping apparatus according to claim 1, wherein the applicator members are mounted in locating grooves made in the base plate in such a way as to be open towards the bottom and outside, said applicator members projecting laterally from said locating grooves.

5. A deposition and preshaping apparatus according to claim 1, wherein the applicator members, more specifically those opposite the junction wall portions are arranged at different levels relative to the upper face of the base plate.

6. A deposition and preshaping apparatus according to claim 1, wherein the maintaining means comprise a supporting spring placed between the base plate and the machine frame on which said plate is mounted and which to normally maintain said plate above the level of the inner shoulder of the shaping cavity when the moulding unit occupies its upper position.

7. A deposition and preshaping apparatus according to claim 1, wherein the supporting spring is placed in one of the positions: between the machine frame and the supporting rod of the base plate and between the supporting rod and the base plate.

8. A deposition and preshaping apparatus according to claim 1, wherein the maintaining means comprise above each applicator member a covering finger mounted so as to pivot about a horizontal spindle fixed to the base plate and wherein the base plate has a radially extending locating groove for each covering finger and which serves to receive without significant lateral clearance said pivotable finger whose upper face can coincide with that of the base plate and whose outer portions constitute lateral covering protuberances which can be located in the passage slots.

9. A deposition and preshaping apparatus according to claim 8, wherein the front face of each covering finger and located opposite the inner side walls of the shaping cavity of the mould has on the one hand a cross-sectional configuration which is identical to that of the cross-section of the inner wall portion opposite to which is located said finger and on the other hand in vertical radial section passing through the axis of the shaping cavity a curved relief configuration passing from top to bottom and from the outside to the inside of the shaping cavity, whereby the minimum spacing between the front face of the finger and the corresponding inner wall portion is at least equal to the thickness of the band section.

10. A deposition and preshaping apparatus according to claim 9, wherein the covering finger has means which draw its outer portion downwards.

11. A deposition and preshaping apparatus according to claim 10, wherein the means which draw the outer portion of the covering finger downwards comprise a supplementary mass located between the front face and the pivot pin of said finger.

12. A deposition and preshaping apparatus according to claim 8, wherein a positioning stop is integral with the covering finger and is arranged to bear against a portion of the base plate when said finger is in the horizontal position in such a way as to prevent the upper face of the finger from passing below the level of the upper face of the base plate.

13. A deposition and preshaping apparatus according to claim 8, wherein the covering finger is associated with a return spring which biases said finger in such a way as to slightly raise its upper face above the upper face of the base plate.

14. A deposition and preshaping apparatus according to claim 13, wherein the base plate has a central recess for the return spring, as well as a supporting cup located in said central recess and is suspended on positioning stops of the different covering fingers in such a way as to be located at a limited distance from the central opening when said fingers are in the horizontal position and which also serves as a support for one of the ends of said return spring, the other end of which bears against the upper wall of the central opening.

15. A deposition and preshaping apparatus according to claim 1, wherein said base plate has deflectors positioned below and retracted relative to the outer portion of the applicator members and which are fixed to the base plate and which are inwardly and downwardly inclined and positioned tangentially relative to said applicator members.

* * * * *